United States Patent
Bengtsson et al.

(10) Patent No.: US 11,603,164 B2
(45) Date of Patent: Mar. 14, 2023

(54) ELECTRIC FRICTION DRIVE DEVICE AND ELECTRIC DRIVE SYSTEM

(71) Applicant: Zipforce AB, Stockholm (SE)

(72) Inventors: Tore Bengtsson, Vaxholm (SE); Møns Bengtsson, Vaxholm (SE)

(73) Assignee: Zipforce AB, Stockholm (SE)

( * ) Notice: Subject to any disclaimer, the term of this patent is extended or adjusted under 35 U.S.C. 154(b) by 203 days.

(21) Appl. No.: 16/651,323

(22) PCT Filed: Sep. 20, 2018

(86) PCT No.: PCT/EP2018/075425
§ 371 (c)(1),
(2) Date: Mar. 26, 2020

(87) PCT Pub. No.: WO2019/063398
PCT Pub. Date: Apr. 4, 2019

(65) Prior Publication Data
US 2020/0231248 A1 Jul. 23, 2020

(30) Foreign Application Priority Data

Sep. 26, 2017 (SE) .................................... 1751191-6

(51) Int. Cl.
*B62M 6/75* (2010.01)
*B62M 6/90* (2010.01)
(Continued)

(52) U.S. Cl.
CPC .............. *B62M 6/75* (2013.01); *B62M 6/90* (2013.01); *B62M 13/04* (2013.01); *B62M 6/50* (2013.01)

(58) Field of Classification Search
CPC . B62M 6/50; B62M 6/75; B62M 6/90; B62M 13/04
(Continued)

(56) References Cited

U.S. PATENT DOCUMENTS 3,921,745 A * 11/1975 McCulloch .............. B62M 6/60
301/6.5
3,966,007 A * 6/1976 Havener .................... B62J 9/22
180/220
(Continued)

FOREIGN PATENT DOCUMENTS

GB 644453 A 10/1950
GB 1499933 A 2/1978

OTHER PUBLICATIONS

International Search Report and Written Opinion for PCT/EP2018/075425, dated Dec. 21, 2018.
(Continued)

*Primary Examiner* — Kevin Hurley
*Assistant Examiner* — Felicia L. Brittman
(74) *Attorney, Agent, or Firm* — Marshall, Gerstein & Borun LLP

(57) ABSTRACT

The present invention relates to an electric drive system for a bike comprising a portable electric friction drive device and a bike bracket. A first drive device attachment point is located at a rear part of the friction drive device. A second drive device attachment point is located between the front part of the friction drive device and the rear part of the friction drive device. An inclination control arrangement is configured to control the inclination of the imaginary line between the second drive device attachment point and a contact point of the drive wheel by adjusting the tilt of the friction drive device over the second drive device attachment point. The bike has at least one wheel, comprising the electric drive system, wherein the drive wheel is arranged to be contactable to the tire of said wheel at said contact point.

18 Claims, 6 Drawing Sheets

(51) Int. Cl.
*B62M 13/04* (2006.01)
*B62M 6/50* (2010.01)

(58) Field of Classification Search
USPC .......................................................... 180/220
See application file for complete search history.

(56) References Cited

U.S. PATENT DOCUMENTS

2005/0269146 A1   12/2005   Motte Dit Falisse et al.
2016/0347408 A1   12/2016   Guida

OTHER PUBLICATIONS

Office Action received for CN Application No. 201880061944.6, dated Apr. 26, 2021.
Office Action received for CN Application No. 201880061944.6 dated May 25, 2022.
Office Action received for CN Application No. 201880061944.6 dated Dec. 22, 2022.

* cited by examiner

ELECTRIC FRICTION DRIVE DEVICE AND ELECTRIC DRIVE SYSTEM

TECHNICAL FIELD

The present invention relates to an electric drive system for a bike comprising a portable electric friction drive device and a bike bracket configured to be mounted on a bike. Further, the invention relates to a portable electric friction drive device. Yet further, the invention relates to a bike having a least one wheel, comprising the electric drive system.

BACKGROUND ART

Existing electric drive systems and portable electric friction drive devices for electric bike motors driving on the front or rear bike wheel comprise a variety of moving parts which have made them heavy, impractical and that they cannot provide different friction to the wheel for braking and recharging, dynamically desired assistance or free rolling.

On traditional electric bikes you have either a hub engine (front or rear) or a crankcase engine. The hub engine can be used for regeneration, but always need to rotate, which gives a braking effect, depending on the magnetic and electrical losses, whether or not the engine is required.

US2016347408 relates to friction drive systems, control algorithms for friction drive systems, and automatic traction control for friction drive systems. Embodiments of friction drive systems and methods may improve control over an amount of normal force between a contact surface on a friction drive, e.g. disposed on a drive motor, and a tire or wheel of a wheeled vehicle. Embodiments of friction drive systems and methods may dynamically adjust the normal force between the contact surface and the tire or wheel in response to rapidly changing conditions, such as weather, road surface, and/or tire inflation.

SUMMARY OF THE INVENTION

The present invention relates to an electric drive system for a bike comprising a portable electric friction drive device and a bike bracket configured to be mounted on a bike. The bike bracket comprises at least first and second bracket attachment points configured to hold the friction drive device. The bike bracket is configured to be rigidly attached to at least two positions on a bike. The friction drive device comprises at least first and second drive device attachment points configured to attach the friction drive device to the bike bracket; a drive wheel arranged at a front part of the friction drive device, adapted to be contactable to a tire of a bike at a contact point; an electric motor connected to the drive wheel, wherein the electric motor is configured to drive the drive wheel; a battery unit connected to the motor; and an inclination control arrangement adapted to control the inclination of an imaginary line between the second drive device attachment point and the contact point of the drive wheel in relation to the tangent line of a tire at said contact point during use of a bike. The first drive device attachment point is configured to be attached to the first bracket attachment point. The second drive device attachment point is configured to be attached to the second bracket attachment point. The first drive device attachment point is located at a rear part of the friction drive device. The second drive device attachment point is located between the front part of the friction drive device and the rear part of the friction drive device so that the friction drive device is configured to rest against the second bracket attachment point. The inclination control arrangement is configured to control the inclination of the imaginary line between the second drive device attachment point and the contact point of the drive wheel by adjusting the tilt of the friction drive device over the second drive device attachment point.

An advantage, of that the inclination control arrangement is configured to control the inclination of the imaginary line between the second drive device attachment point and the contact point of the drive wheel by adjusting the tilt of the friction drive device over the second drive device attachment point, is that no other movable part of the electric drive system is needed in order to put the drive wheel in position for driving a wheel of a bike. Another advantage is that the electric drive system also is suitable for letting a wheel of a bike drive the drive wheel in order to recharge a battery unit of the friction drive device, since the whole friction drive device is tilted over the second drive device attachment point in order to apply a pressure against a bike tire and thus the whole friction drive device is positioned substantially in the tangent line to a tire at said contact point, i.e. the friction drive device has a neutral inclination angle compared to the tangent. Hence, the friction drive device is not pushed away from a tire of a bike during recharging of the battery unit as in other solutions, where the drive wheel is pivotally coupled to the friction drive device and does not have a neutral inclination angle compared to the tangent. Hence recharge during braking can be significantly increased in comparison with other solutions, where the drive wheel is pivotally coupled to the friction drive device.

This gives the unexpected advantage that the motor is used only when required, during braking to recharge the battery unit or driving the drive wheel for assistance of driving a bike, and otherwise the bike wheel can rotate completely freely. Hence, higher energy efficiency of the battery unit is obtained.

According to an example of the invention, said friction drive device is arranged such that when the drive wheel is pushed towards a tire of a bike an angle between said imaginary line and the tangent line to a tire at said contact point is less than 20°. An advantage is that the motor may be driven as a generator in the recharge mode without pushing the drive wheel away from a bike tire when trying to recharge.

According to a further example of the invention, said friction drive device is arranged such that when the drive wheel is pushed towards a tire of a bike an angle between said imaginary line and the tangent line to a tire at said contact point is less than 10°. An advantage is that the motor may be driven as a generator in the recharge mode without pushing the drive wheel away from a bike tire when trying to recharge.

According to another example of the invention, the inclination control arrangement is arranged at the rear part of the friction drive device and is configured to tilt the friction drive device by moving the friction drive device in a direction substantially perpendicular to said imaginary line to cause a rotational movement over the second drive device attachment point. An advantage is that it is easy to arrange the drive wheel such that the drive wheel applies a pressure against a tire of a bike.

According to another example of the invention, the first drive device attachment point comprises a clamping bolt and the first bracket attachment point comprises a clamp configured to receive and lock the clamping bolt with a spring loaded lever when the friction drive device is inserted in the bike bracket. An advantage is that a simple and secure configuration for securely attaching and holding the friction drive device to the bike bracket is obtained.

According to a further example of the invention, the second drive device attachment point comprises at least one bolt and the second bracket attachment point comprises at least one elongated opening configured to receive the bolt when the friction drive device is inserted in the bike bracket. An advantage is that a simple and secure configuration for securely attaching and holding the friction drive device to the bike bracket is obtained.

According to another example of the invention, the second drive device attachment point comprises two bolts and the second bracket attachment point comprises two elongated opening being spaced apart by the drive wheel. An advantage is that a simple and secure configuration for securely attaching and holding the friction drive device to the bike bracket is obtained.

According to a further example of the invention, the inclination control arrangement comprises a tensioning screw or piston arranged to control the tilt of the friction drive device over the second drive device attachment point. An advantage is that the tilt of the friction drive device towards a bike tire easily can be manually changed.

According to another example of the invention, the clamp is arranged on the tensioning screw or piston. An advantage is that a simple and secure configuration for securely attaching and holding the friction drive device to the bike bracket is obtained.

According to a further example of the invention, the electric motor is located in the drive wheel. An advantage of this configuration is that there are no movable parts and no gearing introducing friction losses is needed.

According to another example of the invention, the drive wheel, the electric motor, the inclination control arrangement and the battery unit are arranged in a common housing of the friction drive device. An advantage is that a rigid and portable friction drive device is obtained. Further, the invention relates to a portable electric friction drive device. The device comprises at least first and second drive device attachment points adapted to attach the friction drive device to a bike bracket; a drive wheel arranged at a front part of the friction drive device, adapted to be contactable to a tire of a bike at a contact point; an electric motor connected to the drive wheel, wherein the electric motor is configured to drive the drive wheel; a battery unit connected to the motor; and an inclination control arrangement adapted to control the inclination of an imaginary line between the second drive device attachment point and the contact point of the drive wheel in relation to the tangent of a tire at said contact point during use of a bike. The first drive device attachment point is located at a rear part of the friction drive device. The second drive device attachment point is located between the front part of the friction drive device and the rear part of the friction drive device so that the friction drive device is adapted to rest against a bike bracket at the second drive device attachment point. The inclination control arrangement is configured to control the inclination of the imaginary line between the second drive device attachment point and the contact point of the drive wheel by adjusting the tilt of the friction drive device over the second drive device attachment point.

An advantage of that the inclination control arrangement is configured to control the inclination of the imaginary line between the second drive device attachment point and the contact point of the drive wheel by adjusting the tilt of the friction drive device over the second drive device attachment point, is that no other movable part of the electric friction drive device is needed in order to put the drive wheel in position for driving a wheel of a bike. Another advantage is that the electric friction drive device also is suitable for letting a wheel of a bike drive the drive wheel in order to recharge a battery unit of the friction drive device, since the whole friction drive device is tilted over the second drive device attachment point in order to apply a pressure against a bike tire and thus the whole friction drive device is positioned substantially in the tangent line to a tire at said contact point, i.e. the friction drive device has a neutral inclination angle. Hence, the friction drive device is not pushed away from a tire of a bike during recharging of the battery unit as in other solutions, where the drive wheel is pivotally coupled to the friction drive device. Hence recharge during braking can be significantly increased in comparison with other solutions, where the drive wheel is pivotally coupled to the friction drive device. This gives the unexpected advantage that the motor is used only when required, during braking to recharge the battery unit or driving the drive wheel for assistance of driving a bike, and otherwise the bike wheel can rotate completely freely.

Yet further, the invention relates to a bike having at least one wheel, comprising the electric drive system for a bike, wherein the drive wheel is arranged to be contactable to the tire of said wheel at said contact point.

BRIEF DESCRIPTION OF THE DRAWINGS

The invention will be further described with reference to the accompanying drawings.

DETAILED DESCRIPTION

Figure 1:
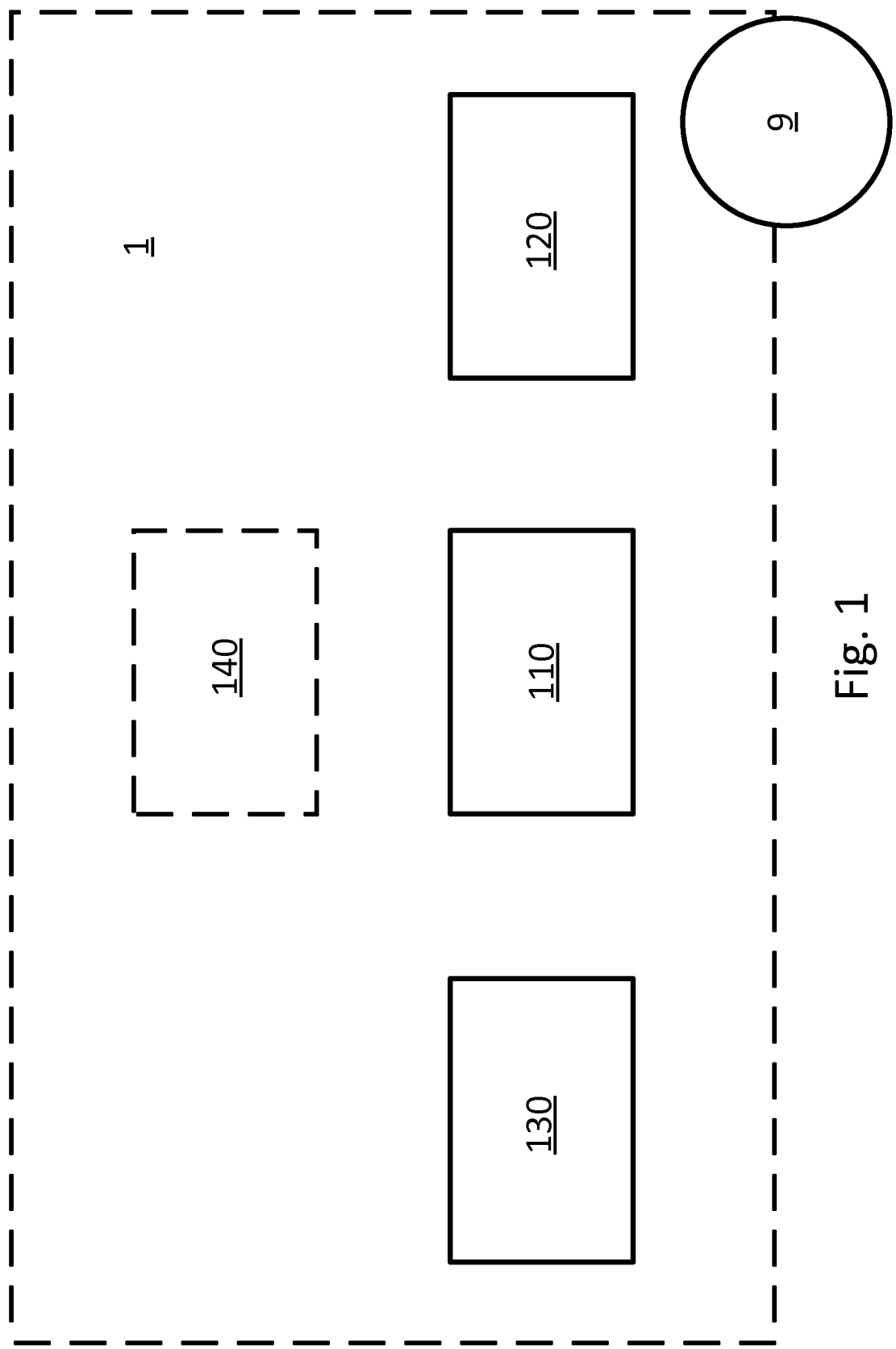
FIG. 1 is a functional block diagram showing an example of an electric friction drive device according to the invention.

FIG. 1 is a functional block diagram showing an example of an electric friction drive device 1 according to the invention. The friction drive device 1 comprises a control unit 110, an electric motor 120 and a battery unit 130. The control unit 110 is connected to the electric motor 120 and the battery unit 130. The electric motor 120 is connected to a drive wheel 9 and the battery unit 130. The electric motor 120 may be arranged to drive the drive wheel 9 in a drive mode or to be driven by the drive wheel 9 so as to function as an electric generator recharging the battery unit 130. The control unit 110 comprises a motor controller and is configured to control if the electric friction drive device 1 is in the drive mode, i.e. the battery unit 130 is driving the electric motor 120 or if the electric friction drive device 1 is in the recharge mode, i.e. the electric motor 120 is recharging the battery unit 130. Hence, the control unit 110 may be configured to alter the drive of said friction drive device 1 between a drive mode and a recharge mode. Further, the control unit 110 is configured to turn off the electric motor 120 when the electric friction drive device 1 is not in use. Thus, an improved solution for energy efficiency of the battery unit 130 is obtained.

The electric motor 120 may be configured to be able to drive the drive wheel 9 both clockwise and counter clockwise i.e. in any of the two possible directions. Further, the control unit 110 may comprise external interfaces, through which a user can control settings of the friction drive device 1. The settings may include controlling if the friction drive device 1 is in drive mode or recharge mode. Alternatively, the control unit 110 is configured to determine if the friction drive device 1 should be in drive mode or recharge mode, based on measured data. This measured data may include measured velocity and/or expected battery life time.

The friction drive device 1 may comprise an inclination control motor 140 configured to control the inclination of the friction drive device 1. According to this embodiment, the inclination control motor 140 is connected to and controlled by the control unit 110. The friction drive device 1 may have buttons connected to the control unit 110 to control the inclination control motor 140 and thereby the inclination of the friction drive device 1.

Figure 2:
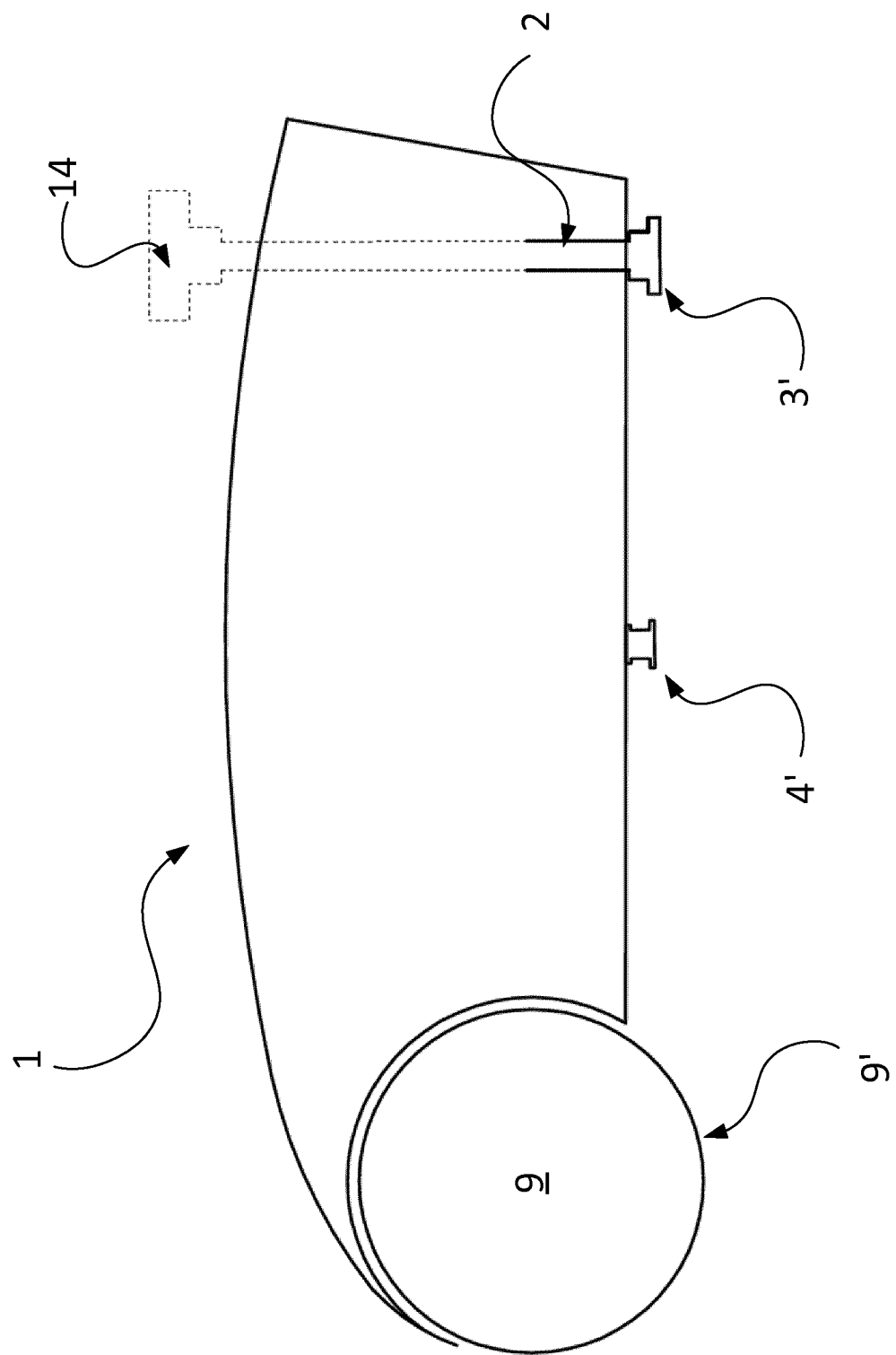
FIG. 2 shows an example of an electric friction drive device according to the invention.

FIG. 2 shows an example of the electric friction drive device 1 according to the invention. The electric friction drive device 1 comprises at least first and second drive device attachment points 3', 4' adapted to attach the friction drive device 1 to a bike bracket. Further, the friction drive device 1 comprises a drive wheel 9 arranged at a front part of the friction drive device 1, adapted to be contactable to a tire of a bike at a contact point 9'. Hereinafter, the front part is referred to the part where the drive wheel 9 is arranged. Consequently, the front direction of the friction drive device 1 is defined as the direction towards the extension of the friction drive device 1 in the drive wheel direction. The electric motor 120 is connected to the drive wheel 9. The electric motor 120 is configured to drive the drive wheel 9. The friction drive device 1 comprises an inclination control arrangement 2 adapted to control the inclination of an imaginary line between the second drive device attachment point 4' and the contact point 9' of the drive wheel 9. The first drive device attachment point 3' is located at a rear part of the friction drive device 1. The second drive device attachment point 4' is located between the front part of the friction drive device 1 and the rear part of the friction drive device 1 so that the friction drive device 1 is adapted to rest against a bike bracket at the second drive device attachment point 4. The inclination control arrangement 2 is configured to control the inclination of the imaginary line between the first drive device attachment point 3' and the contact point 9' of the drive wheel 9 by adjusting the tilt of the friction drive device 1 over the second drive device attachment point 4'.

The first drive device attachment point 3' may comprise a clamping bolt. The second drive device attachment point 4' may comprise at least one bolt.

The drive wheel 9, the electric motor 120, the inclination control arrangement 2 and the battery unit 130 are arranged in a common housing of the friction drive device 1. Hence, no other movable part of the electric drive system is needed in order to put the drive wheel in position for driving a wheel of a bike.

The inclination control arrangement 2 may be arranged at the rear part of the friction drive device 1 and may be configured to tilt the friction drive device 1 by moving the friction drive device 1 in a direction substantially perpendicular to said imaginary line to cause a rotational movement over the second drive device attachment point 4'.

The inclination control arrangement 2 may comprises a tensioning screw or piston 14 arranged to control the tilt of the friction drive device 1 over the second drive device attachment point 4. Thus, the tensioning screw or piston 14 is arranged to control the pressure against a tire at the contact point 9'. In one example the tensioning screw or piston 14 is spring loaded. The tensioning screw or piston 14 may comprise a handle configured such that a user can adjust the tilt of the friction drive device 1 by adjusting the position of the first drive device attachment point 3'. In an alternative embodiment the tilt of the friction drive device 1 is adjusted by buttons electrically connected to the control unit 110 to control the inclination control motor 140 and thereby the inclination of the friction drive device 1.

In another example, the tilt of the friction drive device 1 is adjusted by measurement data received by the control unit 110. The measurement data may be related to the battery condition of the battery unit 130. Alternatively, the measurement data may be related to measured speed at which the friction drive device 1 is travelling.

Figure 3:
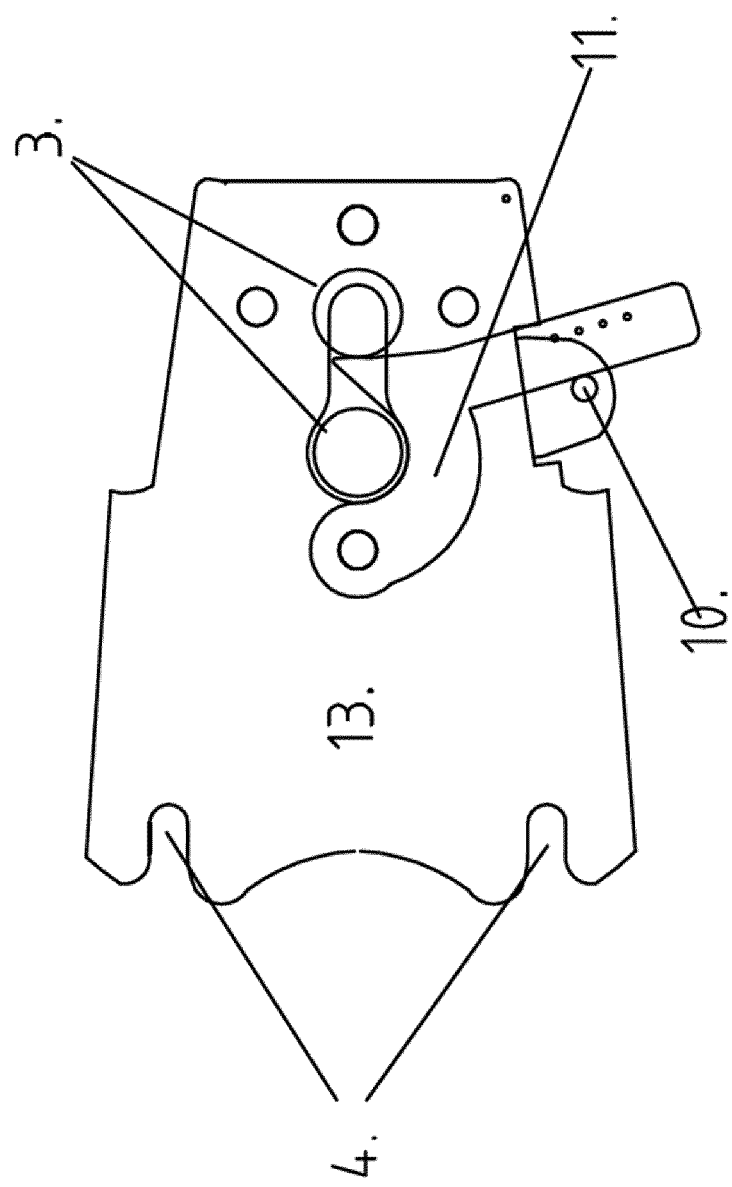
FIG. 3 shows an example of a bike bracket according to the invention.

FIG. 3 shows an example of a bike bracket 13 according to the invention. The bike bracket 13 comprising at least first and second bracket attachment points 3, 4 configured to hold the friction drive device 1. The first bracket attachment point 3 may comprise a clamp configured to receive and lock the friction drive device 1 with a spring loaded lever 11 when the friction drive device 1 is inserted in the bike bracket 13. The second bracket attachment point 4 may comprise at least one elongated opening configured to receive the bolt when the friction drive device 1 is inserted in the bike bracket 13. The second bracket attachment point 4 may comprise two elongated opening being spaced apart by the drive wheel 9. To prevent theft, the bike bracket 13 may comprise a hook 10 to which a padlock can be attached to lock the friction drive device 1 to the bike bracket 13.

Figure 4:
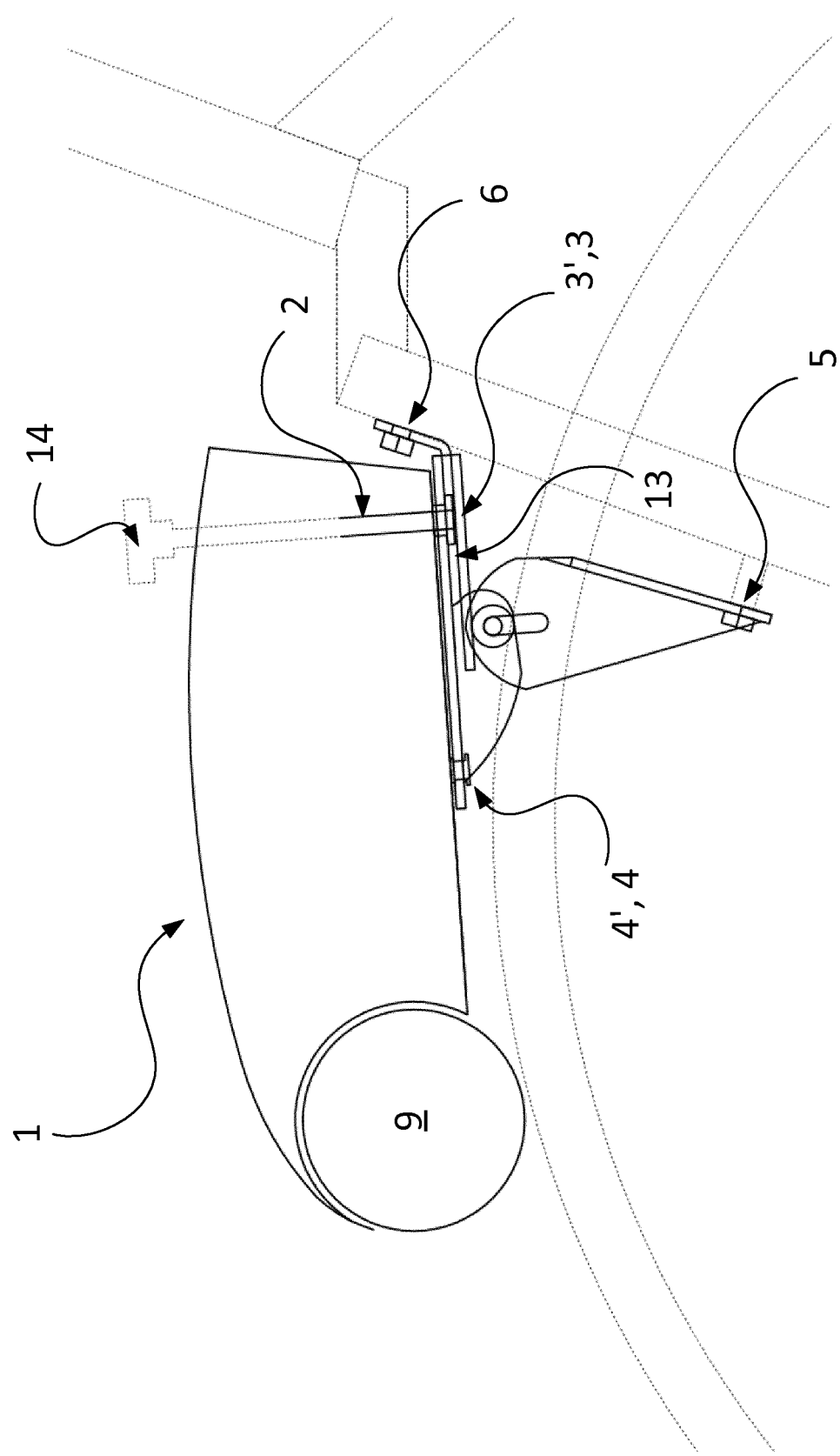
FIG. 4 shows an example of an electric drive system for a bike comprising a portable electric friction drive device and a bike bracket configured to be mounted on a bike.

FIG. 4 shows an example of an electric drive system for a bike comprising the portable electric friction drive device 1 and the bike bracket 13 configured to be mounted on a bike. The bike bracket 13 comprising at least first and second bracket attachment points 3, 4 configured to hold the friction drive device 1, wherein the bike bracket 13 is configured to be rigidly attached to at least two positions 5, 6 on a bike. The friction drive device 1 comprises at least first and second drive device attachment points 3', 4' configured to attach the friction drive device 1 to the bike bracket 13. Further, the friction drive device 1 comprises a drive wheel 9 arranged at a front part of the friction drive device 1, adapted to be contactable to a tire of a bike at a contact point. Yet further, the friction drive device 1 comprises an electric motor 120 connected to the drive wheel 9, wherein the electric motor is configured to drive the drive wheel 9. Further, the friction drive device 1 comprises a control unit 110 and a battery unit 130 connected to the motor. Yet further, the friction drive device 1 comprises an inclination control arrangement 2 adapted to control the inclination of an imaginary line between the second drive device attachment point 4' and the contact point of the drive wheel 9 in relation to the tangent line of a tire at said contact point 9' during use of a bike. The first drive device attachment point 3' is configured to be attached to the first bracket attachment point 3. The second drive device attachment point 4' is configured to be attached to the second bracket attachment point 4. The first drive device attachment point 3' is located at a rear part of the friction drive device 1. The second drive device attachment point 4' is located between the front part of the friction drive device 1 and the rear part of the friction drive device 1 so that the friction drive device 1 is configured to rest against the second bracket attachment point 4. The inclination control arrangement 2 is configured to control the inclination of the imaginary line between the second drive device attachment point 4' and the contact point 9' of the drive wheel 9 by adjusting the tilt of the friction drive device 1 over the second drive device attachment point 4'.

According to one example, the first drive device attachment point 3' comprises a clamping bolt and the first bracket attachment point 3 comprises a clamp configured to receive and lock the clamping bolt with a spring loaded lever 11 when the friction drive device 1 is inserted in the bike bracket. Hence, the first bracket attachment point 3 comprises a locking mechanism to attach the first drive device attachment point 3' to the first bracket attachment point 3 in a secure manner.

According to one example, the second drive device attachment point 4' comprises at least one bolt and the second bracket attachment point 4 comprises at least one elongated opening configured to receive the bolt when the friction drive device 1 is inserted in the bike bracket.

According to another example, the second drive device attachment point 4' comprises two bolts and the second bracket attachment point 4 comprises two elongated opening being spaced apart by the drive wheel 9.

Figure 5:
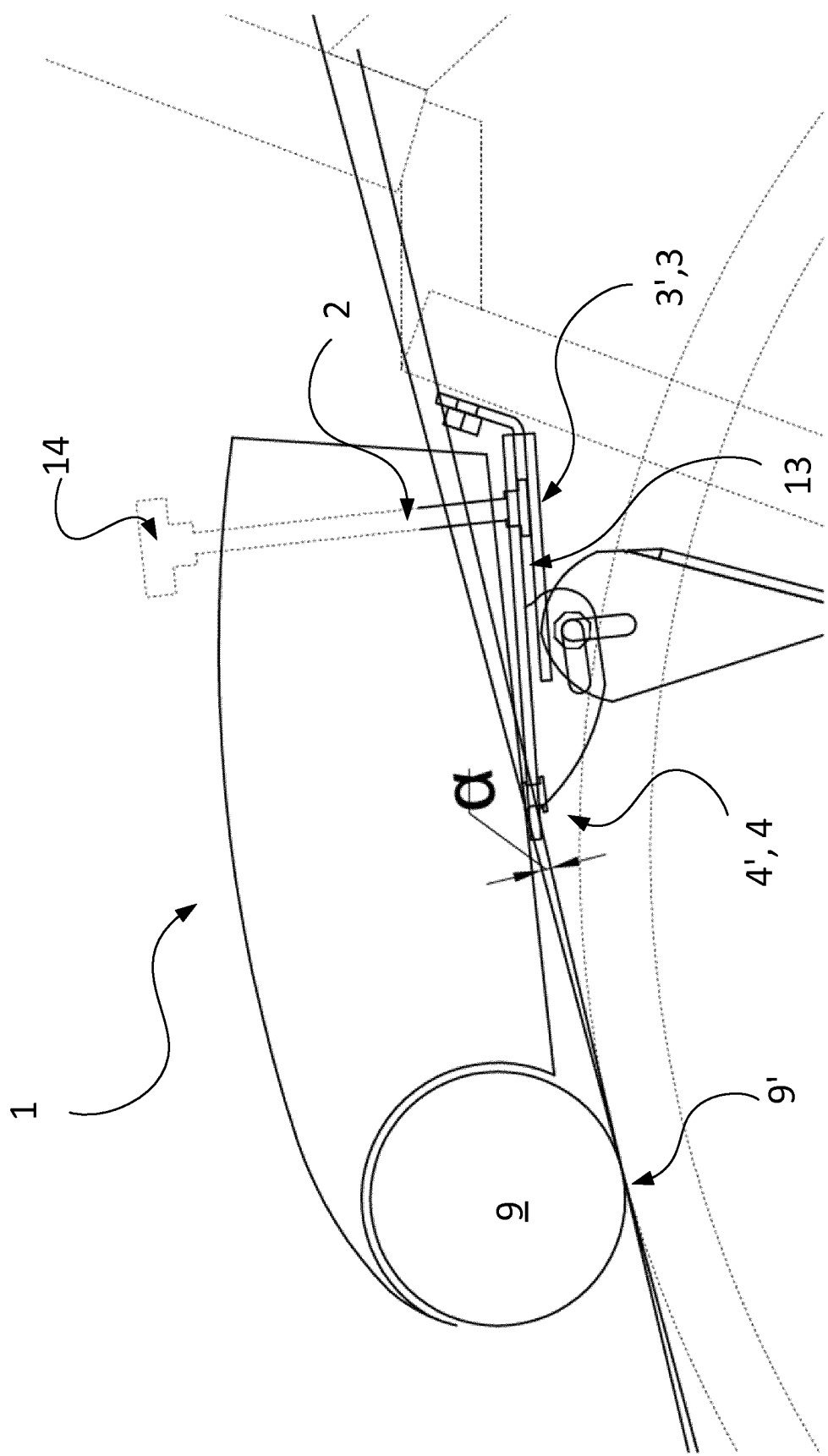
FIG. 5 shows an example of an electric drive system wherein the portable electric friction drive device is in contact with a tire of a bike.

According to one example, the clamp is arranged on the tensioning screw or piston 14. FIG. 5 shows an example of an electric drive system wherein the portable electric friction drive device 1 is in contact with a tire of a bike. As explained above, the inclination control arrangement 2 is configured to control the inclination of the imaginary line between the second drive device attachment point 4' and the contact point 9' of the drive wheel 9 by adjusting the tilt of the friction drive device 1 over the second drive device attachment point 4'.

In one example the friction drive device 1 is arranged such that, when the drive wheel 9 is pushed towards a tire of a bike, an angle $\alpha$ between said imaginary line and the tangent line to a tire at said contact point 9' is less than 20°. When the angle $\alpha$ is less than 20°, the friction drive device 1 is not pushed away from a tire of a bike during recharging of the battery unit 130. Hence, the friction drive device 1 can be used for recharging the battery unit 130.

In another example the friction drive device 1 is arranged such that, when the drive wheel 9 is pushed towards a tire of a bike, the angle $\alpha$ between said imaginary line and the tangent line to a tire at said contact point is less than 10°. This improves the ability to recharge the battery unit 130. Further, it is possible to adjust the tilt of the electric friction drive device 1 over the second drive device attachment point 4' and thereby to adjust the pressure which the drive wheel 9 is configured to apply to a tire at said contact point 9'. Hence, it is possibly to vary the friction between said contact point 9' and a tire of a bike depending on the situation. In one example, this adjustment is obtained be manually using the tensioning screw or piston 14 to control the tilt of the friction drive device 1 over the second drive device attachment point 4'. In another example, the control unit 110 is configured to control the tilt of the friction drive device 1 over the second drive device attachment point 4' based on measured pressure applied to the drive wheel 9 from a tire of a bike. Thus, the electric friction drive device 1 enables the driver to easily configure the amount of assistance needed. Consequently, the electric friction drive device is also suitable for letting a wheel of a bike drive the drive wheel in order to recharge a battery unit of the friction drive device. Hence, the friction drive device is not pushed away from a tire of a bike during recharging of the battery unit as in other solutions, where the drive wheel is pivotally coupled to the friction drive device and does not have a neutral inclination angle compared to the tangent. Thus, recharge during braking can be significantly increased in comparison with other solutions, where the drive wheel is pivotally coupled to the friction drive device. This gives the unexpected advantage that the motor is used only when required, during braking to recharge the battery unit or driving the drive wheel for assistance of driving a bike, and otherwise the bike wheel can rotate completely freely.

This gives unexpected benefits because the electrical, magnetic and motion losses can be significantly reduced. This means that the friction drive device 1 will be able to drive a bike further on the same battery capacity compared to standard solutions available on the market.

The friction drive device 1 may comprise at least one sensor connected to the control unit 110. In this case, the control unit 110 is configured to control the inclination control motor 140 and thereby the inclination of the friction drive device 1 based on data received from the at least one sensor.

At least one sensor may be arranged to measure a pressure applied to the drive wheel 9 from a tire of a bike. In this case the control unit 110 is configured to control the inclination control motor 140 and thereby the inclination of the friction drive device 1 based on the measured pressure applied to the drive wheel 9 from a tire of a bike. Hence, the control unit 110 is configured to adjust the tilt of the friction drive device 1 over the second drive device attachment point 4' based on the measured pressure applied to the drive wheel 9 from a tire of a bike. An advantage is that the control unit 110 can control the pressure applied to the drive wheel 9 from a tire of a bike. Further, the control unit 110 can determine if the drive wheel 9 is in contact with a tire of a bike at the contact point 9' by determining if a pressure is applied to the drive wheel 9 from a tire of a bike. If no pressure is applied to the drive wheel 9, the control unit 110 may turn off the electric motor 120. Hence, it is possible for the control unit 110 to monitor and control the measured pressure applied to the drive wheel 9 from a tire of a bike and to turn off the electric motor 120 when the drive wheel 9 is not applied to a tire. An advantage is that higher energy efficiency of the battery unit 130 is obtained.

In another example, the at least one sensor may be arranged to measure the battery condition of the battery unit 130. In this case the control unit 110 is configured to control the inclination control motor 140 and thereby the inclination of the friction drive device 1 based on the battery condition of the battery unit 130. An advantage is that higher energy efficiency of the battery unit 130 is obtained.

Further, the at least one sensor may be arranged to measure the speed at which the friction drive device 1 is travelling. In this case, the control unit 110 is configured to control the inclination control motor 140 and thereby the inclination of the friction drive device 1 based on the speed at which the friction drive device 1 is travelling. Yet further, the friction drive device 1 may comprise at least one data input connected to the control unit 110. In this case, the control unit 110 is configured to control the inclination control motor 140 and thereby the inclination of the friction drive device 1 based on data received from the at least one data input. An advantage is that higher energy efficiency of the battery unit 130 is obtained.

The friction drive device 1 is adapted to be positioned at a front wheel of a bike such that the drive wheel 9 is directed in the front direction of the friction drive device 1. In this configuration the drive device 1 is suitable for letting a front wheel of a bike drive the drive wheel 9 in order to recharge a battery unit of the friction drive device, since the friction drive device 1 has a neutral inclination angle.

Further, the friction drive device 1 is adapted to be positioned at a back wheel of a bike such that the drive wheel 9 is directed in the back direction of the friction drive device 1. In this configuration the drive device 1 is suitable for letting a back wheel of a bike drive the drive wheel 9 in order to recharge a battery unit of the friction drive device, since the friction drive device has a neutral inclination angle.

Figure 6:
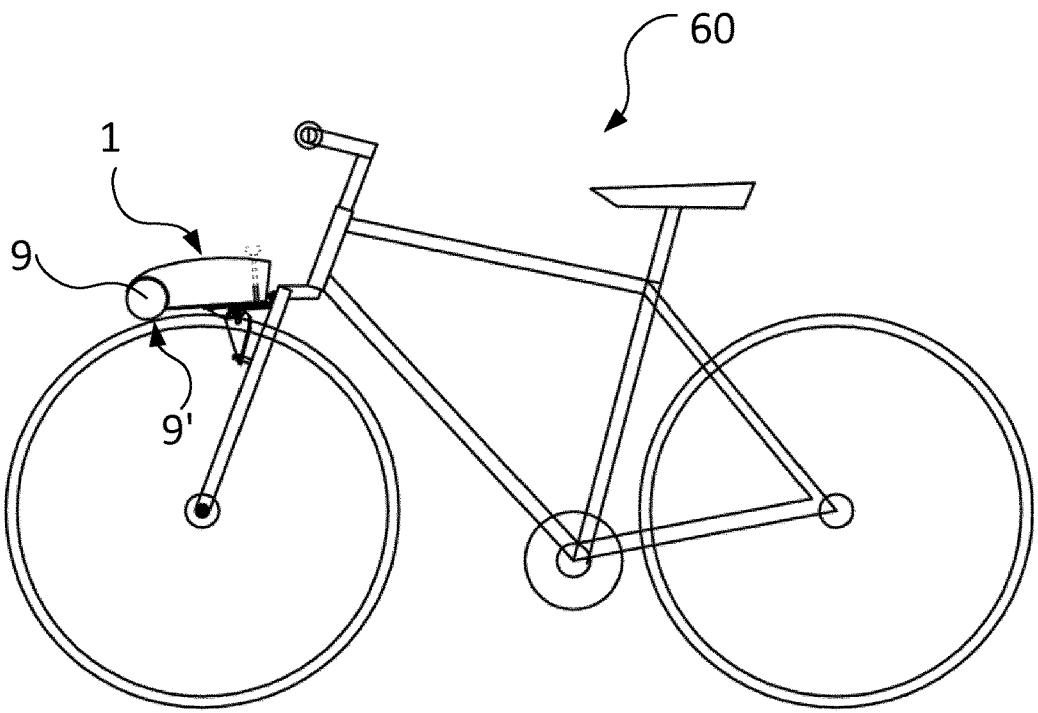
FIG. 6 shows an example where the electric drive system is configured to drive the front wheel.

The electric drive system or the friction drive device 1 can be arranged at any wheel of the bike. FIG. 6 shows an example of a bike 60 where the electric drive system or the friction drive device 1 is configured to drive the front wheel of the bike 60. In this case the friction drive device 1 is arranged such that the front part, where the drive wheel 9 is arranged, is pointing in the driving direction of the bike. Hence, the friction drive device 1 is configured to drive the front wheel of the bike 60 at the contact point 9' in the front direction of the friction drive device 1. In this configuration the drive device 1 is suitable for letting the front wheel of the bike drive the drive wheel 9 in order to recharge a battery unit of the friction drive device, since the friction drive device 1 has a neutral inclination angle.

Figure 7:
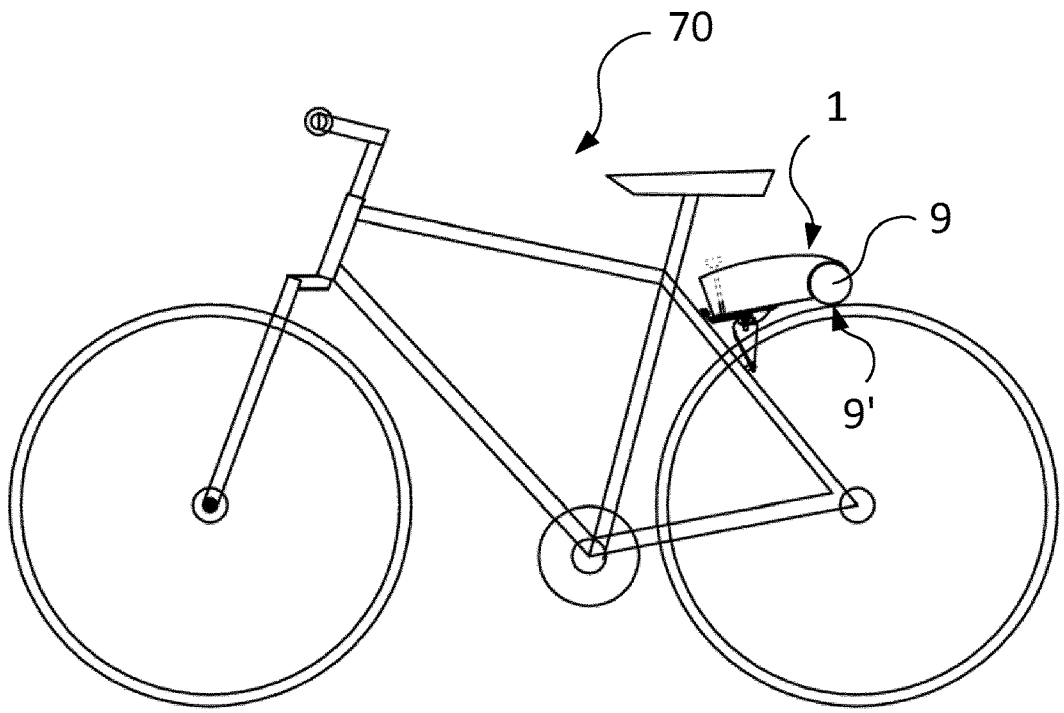
FIG. 7 shows an example where the electric drive system is configured to drive the back wheel.

FIG. 7 shows an example of a bike 70 where the electric drive system or the friction drive device 1 is configured to drive the back wheel of the bike 70. In this case the friction drive device 1 is arranged such that the front part, where the drive wheel 9 is arranged, is pointing in the opposite direction of the driving direction of the bike. This is not a problem, since the electric motor 120 is configured to drive the drive wheel 9 both clockwise and counter clockwise i.e. in any of the two possible directions. Hence, the friction drive device 1 is configured to drive the back wheel of the bike 70 at the contact point 9' in the rear direction of the friction drive device 1, i.e. the opposite direction compared to the front direction. In this configuration the drive device 1 is suitable for letting the back wheel of the bike drive the drive wheel 9 in order to recharge a battery unit of the friction drive device, since the friction drive device has a neutral inclination angle.

According to FIGS. 6 and 7 the bike 60, 70 is bicycle. However, the claimed electric drive system and friction drive device 1 is also suitable to be mounted on a tricycle, a unicycle or a quadricycle. The claimed electric drive system and friction drive device 1 is in fact adapted to be mounted on any wheel of a vehicle.

The invention claimed is:

1. An electric drive system for a bike, the electric drive system comprising:
    a portable electric friction drive device and a bike bracket configured to be mounted on the bike,
    the bike bracket comprising at least first and second bracket attachment points configured to hold the friction drive device, wherein the bike bracket is configured to be rigidly attached to at least two positions on the bike, and
    the friction drive device comprising:
        at least first and second drive device attachment points configured to attach the friction drive device to the bike bracket;
        a drive wheel arranged at a front part of the friction drive device, adapted to be contactable to a tire of the bike at a contact point;
        an electric motor connected to the drive wheel, wherein the electric motor is configured to drive the drive wheel;
        a control unit and a battery unit connected to the motor; and
        an inclination control arrangement adapted to control the inclination of an imaginary line between the second drive device attachment point and the contact point of the drive wheel in relation to the tangent line of the tire at said contact point during use of the bike;
    wherein the first drive device attachment point is configured to be attached to the first bracket attachment point;
    wherein the second drive device attachment point is configured to be attached to the second bracket attachment point;
    wherein:
        the first drive device attachment point is located at a rear part of the friction drive device;
        the second drive device attachment point is located between the front part of the friction drive device and the rear part of the friction drive device so that the friction drive device is configured to rest against the second bracket attachment point;
        the inclination control arrangement is configured to control the inclination of the imaginary line between the second drive device attachment point and the contact point of the drive wheel by adjusting the tilt of the friction drive device over the second drive device attachment point; and
        the inclination control arrangement is arranged at the rear part of the friction drive device and is configured to tilt the friction drive device by moving the friction drive device in a direction substantially perpendicular to said imaginary line to cause a rotational movement over the second drive device attachment point.

2. The electric drive system according to claim 1, wherein said friction drive device is arranged such that when the drive wheel is pushed towards the tire of the bike an angle between said imaginary line and the tangent line to the tire at said contact point-is less than 20°.

3. The electric drive system according to claim 1, wherein said friction drive device is arranged such that when the drive wheel is pushed towards the tire of the bike an angle between said imaginary line and the tangent line to a tire at said contact point is less than 10°.

4. The electric drive system according to claim 1, wherein the electric motor further is configured to be driven by the drive wheel to recharge the battery unit.

5. The electric drive system according to claim 1, wherein said control unit is configured to alter the drive of said friction drive device between a drive mode and a recharge mode.

6. The electric drive system according to claim 1, wherein the first drive device attachment point comprises a clamping bolt and the first bracket attachment point comprises a clamp configured to receive and lock the clamping bolt with a spring loaded lever when the friction drive device is inserted in the bike bracket.

7. The electric drive system according to claim 6, wherein the inclination control arrangement comprises a tensioning screw or piston arranged to control the tilt of the friction drive device over the second drive device attachment point, and wherein the clamp is arranged on the tensioning screw or piston.

8. The electric drive system according to claim 1, wherein the second drive device attachment point comprises at least one bolt and the second bracket attachment point comprises at least one elongated opening configured to receive the bolt when the friction drive device is inserted in the bike bracket.

9. The electric drive system according to claim 1, wherein the second drive device attachment point comprises two bolts and the second bracket attachment point comprises two elongated openings being spaced apart by the drive wheel.

10. The electric drive system according to claim 1, wherein the inclination control arrangement comprises a tensioning screw or piston arranged to control the tilt of the friction drive device over the second drive device attachment point.

11. The electric drive system according to claim 1, wherein the electric motor is located in the drive wheel.

12. The electric drive system according to claim 1, wherein the drive wheel, the electric motor, the inclination control arrangement and the battery unit are arranged in a common housing of the friction drive device.

13. A bike having at least one wheel, comprising the electric drive system for a bike according to claim 1, wherein the drive wheel is arranged to be contactable to the tire of said wheel at said contact point.

14. The electric drive system according to claim 1, wherein the second drive device attachment point is located between the first drive device attachment point and the front part of the friction drive device.

15. A portable electric friction drive device comprising:
at least first and second drive device attachment points adapted to attach the friction drive device to a bike bracket of a bike;
a drive wheel arranged at a front part of the friction drive device, adapted to be contactable to a tire of the bike at a contact point;
an electric motor connected to the drive wheel, wherein the electric motor is configured to drive the drive wheel;
a control unit and a battery unit connected to the motor; and
an inclination control arrangement adapted to control the inclination of an imaginary line between the second drive device attachment point and the contact point of the drive wheel in relation to the tangent of the tire at said contact point during use of the bike;
wherein:
the first drive device attachment point is located at a rear part of the friction drive device;
the second drive device attachment point is located between the front part of the friction drive device and the rear part of the friction drive device so that the friction drive device is adapted to rest against the bike bracket at the second drive device attachment point;
the inclination control arrangement is configured to control the inclination of the imaginary line between the second drive device attachment point and the contact point of the drive wheel by adjusting the tilt of the friction drive device over the second drive device attachment point; and
the inclination control arrangement is arranged at the rear part of the friction drive device and is configured to tilt the friction drive device by moving the friction drive device in a direction substantially perpendicular to said imaginary line to cause a rotational movement over the second drive device attachment point.

16. The portable electric friction drive device according to claim 15, wherein the second drive device attachment point is located between the first drive device attachment point and the front part of the friction drive device.

17. The portable electric friction drive device according to claim 15, wherein the second drive device attachment point comprises two bolts and the second bracket attachment point comprises two elongated openings being spaced apart by the drive wheel.

18. An electric drive system for a bike, the electric drive system comprising:
a portable electric friction drive device and a bike bracket configured to be mounted on a bike,
the bike bracket comprising at least first and second bracket attachment points configured to hold the friction drive device, wherein the bike bracket is configured to be rigidly attached to at least two positions on a bike;
the friction drive device comprising:
at least first and second drive device attachment points configured to attach the friction drive device to the bike bracket;
a drive wheel arranged at a front part of the friction drive device, adapted to be contactable to a tire of a bike at a contact point;
an electric motor connected to the drive wheel, wherein the electric motor is configured to drive the drive wheel;
a control unit and a battery unit connected to the motor; and
an inclination control arrangement adapted to control the inclination of an imaginary line between the second drive device attachment point and the contact point of the drive wheel in relation to the tangent line of a tire at said contact point during use of a bike;
wherein the first drive device attachment point is configured to be attached to the first bracket attachment point;
wherein the second drive device attachment point is configured to be attached to the second bracket attachment point;
wherein:
the first drive device attachment point is located at a rear part of the friction drive device;
the second drive device attachment point is located between the front part of the friction drive device and the rear part of the friction drive device so that the friction drive device is configured to rest against the second bracket attachment point;
the inclination control arrangement is configured to control the inclination of the imaginary line between the second drive device attachment point and the contact point of the drive wheel by adjusting the tilt of the friction drive device over the second drive device attachment point; and
the second drive device attachment point comprises two bolts and the second bracket attachment point comprises two elongated openings being spaced apart by the drive wheel.

* * * * *